May 15, 1962 D. B. CHELTON 3,034,319
HIGH-EFFICIENCY FLUID TRANSFER LINE COUPLING
Filed June 29, 1960
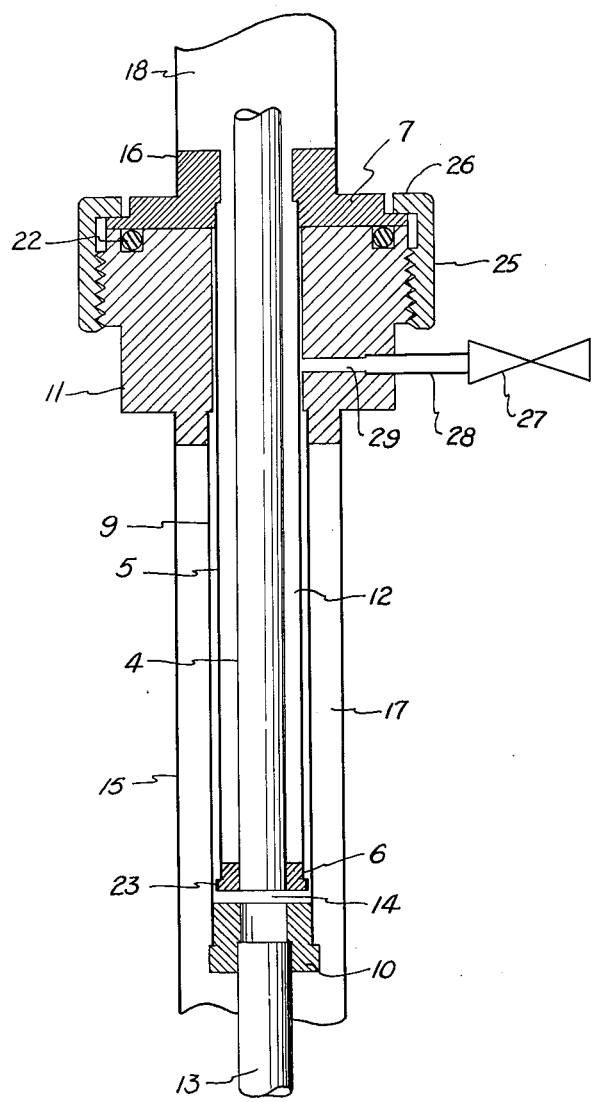
INVENTOR
Dudley B. Chelton
BY David Robbins
John C. Stahl ATTORNEYS

United States Patent Office 3,034,319
Patented May 15, 1962

3,034,319
HIGH-EFFICIENCY FLUID TRANSFER LINE COUPLING
Dudley B. Chelton, Boulder, Colo., assignor to the United States of America as represented by the Secretary of Commerce
Filed June 29, 1960, Ser. No. 39,748
7 Claims. (Cl. 62—531)

This invention relates to a transfer line coupling and in particular to a coupling for a line transferring a fluid having a temperature above or below that of the environment.

In many systems for transferring fluids having a temperature above or below environmental temperature, a transfer line of high efficiency is required. This is particularly true for operations where the lines are used for the transfer of a cryogenic fluid such as liquid oxygen, hydrogen, nitrogen or helium.

Heat flow into a pipe carrying a liquefied gas is objectionable because it wastes liquid by causing evaporation. Also the vapor formed seriously reduces the carrying capacity of the line. The mixture of vapor and liquid, having a lower density than that of the pure liquid, must have a greater velocity in order to maintain a given mass rate of flow. The maximum velocity of two-phase flow in a pipe, however, is much lower than that of a liquid. Because of these and other difficulties, when efficient transfer is required, it is desirable to control conditions to keep the heat influx to the transferred fluid to a minimum. Usually the major portion of the heat influx is introduced by the section couplings.

For the efficient transfer of cryogenic substances, conventional high vacuum-insulated or vacuum-powder insulated transfer lines at present appear to be the most suitable. These lines, however, require good, high vacuum and fabrication techniques. Transfer lines are usually assembled by soldering with a torch or heli-arc welding and, unless considerable fabrication control is exercised, it is quite likely that oxidation, or other deposits will greatly deteriorate the reflectivity of the surfaces and/or prevent the attainment of good vacuum. These factors usually require shop fabrication where suitable control may be exercised and result in couplings suitable only for field installation of long transfer lines. In many cases the necessary couplings in laboratory size transfer lines that are presently available introduce heat transfer that may be objectionable. Transfer lines without couplings may not be practical even in small-scale applications for assembly, disassembly or operational purposes.

Accordingly, it is an object of the present invention to provide a transfer line coupling which reduces the heat leak into the transferred fluid by these couplings to very close to zero.

Another object is to provide a coupling that may be used in laboratory size transfer lines with a heat loss very close to zero.

A further object of the present invention is to provide a transfer line coupling in which heat leak is reduced by taking advantage of the heat required to raise the temperature of a liquid substance, such as oxygen, hydrogen, or especially helium to that of the environment.

This is accomplished by providing an insulated transfer line coupling of conventional design with a narrow annular gap between an inner and an outer insulation tube. A small part of the transferred fluid is permitted to enter the annular gap. As the vapor flows through the gap toward a control valve, it intercepts the normal heat transfer in the coupling. Thus, before the vapor is released from the control valve as a warm gas, maximum use is made of the difference in enthalpy between that of the transferred liquid and the gas at environmental temperature. By controlling the flow of vapor in the gap, it is possible to reduce the heat leak into the transferred fluid by the coupling to that which will evaporate only a small amount of liquid. The heat leak is then very close to zero. In fact, the heat leak may be reduced to exactly zero, if required, by supplying an excess flow of fluid in the annular gap.

The FIGURE in the drawing discloses an embodiment of the present invention.

Referring to the FIGURE, fluid tube 4 is positioned in ring 6 and inner insulation tube 5 is connected between an outer annular shoulder on ring 6 and an inner annular shoulder on ring 7. Similarly, outer insulation tube 9 is located between an outer annular shoulder on ring 10 and an inner annular shoulder on ring 11. Thus, an insulation space 12 is formed between tube 4 and 5 and a small annular gap is formed between tube 5 and tube 9. One end of the connecting fluid tube 13 is positioned in ring 10 and ring 6 is positioned from the latter to provide gap 14. Outer tube 15 is positioned on an outer annular shoulder of ring 11 and outer tube 16 is positioned on an outer annular shoulder of ring 7 to form insulation spaces 17 and 18, respectively.

Neoprene O-ring gas seal 22 is located in a groove in ring 11 and is positioned between rings 7 and 11. A gasket 23, placed around one end of ring 6, forms an orifice, defined by the gasket and tube 9, through which a small amount of liquid is allowed to pass. Evaporation of the liquid takes place and the resulting vapor in the gap between tubes 5 and 9 substantially prevents heat flow into the pipe by absorbing the heat flow along tubes 5 and 9. Ring 11 and removable cap 25 are provided with threads so that the latter may be rotated on ring 11 until the flange 26 engages ring 7. Control valve 27 is connected through tube 28 and orifice 29 to the gap between tubes 5 and 9. Tube 9 should have a low emissivity. The heat capacity of tubes 5 and 9 should be kept small by using thin tubing. This also serves to reduce metallic conduction.

The particular materials used for the transfer line disclosed will, of course, depend upon the intended service.

In assemblying the embodiment disclosed, tube 16 is connected to ring 7, tube 5 is connected between rings 6 and 7 by a suitable method, e.g., welding or soldering, and fluid tube 4 is positioned in ring 6, forming a male unit. Similarly, tubes 9 and 15 are connected by a suitable method to rings 10 and 11, forming a female unit. After seal 22 is inserted in the groove in ring 11, the male unit is inserted in the female unit, and cap 25 is screwed on ring 11 until flange 26 engages ring 7, holding the latter firmly against ring 11 and seal 22.

In a typical operation, control valve 27 will be at pressures less than the substance being transferred. The temperature gradient in the gap between tubs 5 and 9 will range from the fluid temperature near gasket 23 to approximately 300° K. near ring 11. The walls of tubes 5 and 9, which form the gap just referred to, constitute a heat path along which heat is transferred. As liquid is started through the transfer line, a small amount of vapor will be allowed to flow in the gap from ring 6 to ring 11. The vapor absorbs the heat flowing along tubes 5 and 9 so that, if sufficient gas is withdrawn from control valve 27, the heat leak to the transferred liquid will be reduced to substantially zero. In this way, the difference in heat between the temperature of the saturated vapor and the gas at environmental temperature is used to greatest advantage. The gas used in the above-described manner need not be wasted since it usually can be returned to a lower pressure portion of the system.

Obviously, many modifications and variations of the present invention are possible in the light of the above teachings. For example, it is conceivable that the principles taught here could be used to reduce heat loss in an entire transfer line; and although the various tubes and rings are represented as being circular, these elements may be any desired shape. It is therefore to be understood, that within the scope of the appended claims, the invention may be practiced otherwise than as specifically described.

What is claimed is:

1. A coupling for a line transferring a fluid comprising: a first hollow member positioned between a first and second ring, first means for conducting said fluid coupled to said second ring, a second hollow member positioned between a third and fourth ring, second means for conducting said fluid coupled to said fourth ring, said second hollow member being positioned in said first hollow member so that a first gap is formed between said first and second hollow member and a second gap is formed between said second and fourth ring, and a gasket positioned around said fourth ring in such a manner as to form an orifice defined by said gasket and said first hollow member.

2. A coupling for a line transferring a fluid comprising: a first hollow member positioned between a first and second ring, first means for conducting said fluid coupled to said second ring, a second hollow member positioned between a third and fourth ring, second means for conducting said fluid coupled to said fourth ring, said second hollow member being positioned in said first hollow member so that a first gap is formed between said first and second hollow member and a second gap is formed between said second and fourth ring, a control valve connected to said first gap, and a gasket positioned around said fourth ring in such a manner as to form an orifice defined by said gasket and said first hollow member.

3. The coupling set forth in claim 2 including means for holding said first ring in engagement with said third ring.

4. A coupling for a line transferring a fluid comprising: a first hollow member positioned between a first and second ring, first means for conducting said fluid coupled to said second ring, a second hollow member positioned between a third and fourth ring, a third hollow member connected to said third ring, said second hollow member being positioned within said third member, second means coupled to said fourth ring for conducting said fluid, said first hollow member being positioned in said second hollow member so that a first gap is formed between said first and second member and a second gap is formed between said second and fourth ring, a control valve connected to said first gap, and a gasket positioned around said fourth ring in such a manner as to form an orifice defined by said gasket and said first hollow member.

5. The coupling set forth in claim 4 including means for holding said first ring in engagement with said third ring.

6. A coupling for a line transferring a fluid comprising: a female member including a first ring positioned on a first hollow member, a male member including a second ring positioned on a second hollow member, said first and second hollow members being proportioned so that when the latter is positioned in the former a first gap is formed between said first and second ring and a second gap is formed between said first and second hollow member, a control valve, and means for coupling said control valve to said second gap.

7. The coupling recited in claim 6 including a gasket positioned on said second ring in such a manner as to form an orifice defined by said gasket and first hollow member.

References Cited in the file of this patent
UNITED STATES PATENTS

| | | |
|---|---|---|
| 625,759 | Hargrave | May 30, 1899 |
| 916,136 | Ford | Mar. 23, 1909 |
| 1,367,348 | Barnes | Feb. 1, 1921 |
| 2,451,151 | Byram | Oct. 12, 1948 |
| 2,928,254 | Rae | Mar. 15, 1960 |